(12) United States Patent
Wilkes et al.

(10) Patent No.: US 7,045,577 B2
(45) Date of Patent: May 16, 2006

(54) NONISOCYANATE POLYURETHANE MATERIALS, AND THEIR PREPARATION FROM EPOXIDIZED SOYBEAN OILS AND RELATED EPOXIDIZED VEGETABLE OILS, INCORPORATION OF CARBON DIOXIDE INTO SOYBEAN OIL, AND CARBONATION OF VEGETABLE OILS

(75) Inventors: Garth L. Wilkes, Blacksburg, VA (US); Seungman Sohn, Maynard, MA (US); Bahman Tamami, Shiraz (IR)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 10/780,909

(22) Filed: Feb. 19, 2004

(65) Prior Publication Data

US 2004/0230009 A1 Nov. 18, 2004

Related U.S. Application Data

(60) Provisional application No. 60/447,729, filed on Feb. 19, 2003.

(51) Int. Cl.
*C08L 75/12* (2006.01)

(52) U.S. Cl. .............. 525/327.3; 525/327.2; 525/383; 525/540; 528/422; 528/480; 528/483

(58) Field of Classification Search .......... 525/327.2, 525/327.3, 383, 388; 528/480, 483
See application file for complete search history.

(56) References Cited

U.S. PATENT DOCUMENTS

| | | | | |
|---|---|---|---|---|
| 3,072,613 A | * | 1/1963 | Whelan, Jr. et al | 528/211 |
| 5,175,231 A | * | 12/1992 | Rappoport et al. | 528/106 |
| 5,344,897 A | * | 9/1994 | Brindoepke et al. | 525/526 |
| 6,218,480 B1 | * | 4/2001 | Rappoport | 525/459 |
| 6,471,843 B1 | * | 10/2002 | December et al. | 204/506 |

* cited by examiner

*Primary Examiner*—Michael J. Feely
(74) *Attorney, Agent, or Firm*—Whitham, Curtis, Christofferson & Cook, PC (57) ABSTRACT

Novel carbonated vegetable oils (such as carbonated soybean oil) are made by reacting carbon dioxide with an epoxidized vegetable oil. The carbonated vegetable oils advantageously may be used for producing nonisocyanate polyurethane materials.

15 Claims, 8 Drawing Sheets

NONISOCYANATE POLYURETHANE MATERIALS, AND THEIR PREPARATION FROM EPOXIDIZED SOYBEAN OILS AND RELATED EPOXIDIZED VEGETABLE OILS, INCORPORATION OF CARBON DIOXIDE INTO SOYBEAN OIL, AND CARBONATION OF VEGETABLE OILS

CROSS-REFERENCE TO RELATED APPLICATIONS

Priority is claimed to U.S. provisional application 60/447,729 filed Feb. 19, 2003, which is incorporated herein by reference.

DESCRIPTION

1. Field of the Invention

The present invention generally relates to network polymers, more specifically, to methods of producing nonisocyanate polyurethane networks, and the network nonisocyanate polyurethanes produced thereby.

2. Background of the Invention

Conventionally, polyurethanes have been made using, as reagents, toxic isocyanates which are themselves produced from phosgene, which is even more dangerous.

Subsequently, a newer field emerged, of producing polyurethanes without using isocyanates, and certain nonisocyanate polyurethanes (NIPUs) have been provided. For example, most recently, in U.S. Pat. No. 6,120,905, titled "Hybrid Nonisocyanate Polyurethane Network Polymers and Composites Formed Therefrom," issued Sep. 19, 2000 to Figovsky, there are discussed certain nonisocyanate polyurethane networks which are said to be produced based on reactions between oligomers comprising terminal cyclocarbonate groups and oligomers comprising terminal primary amine groups. Such nonisocyanate production methods have a general safety advantage over production methods which typically depend on toxic isocyanates and, in turn, are themselves produced from dangerous phosgene. Additionally, nonisocyanate polyurethanes also address certain desired applications better than isocyanate polyurethanes, such as in composite matrix materials or when chemical resistance to aqueous solutions of acids and alkalies is wanted. However, in the case of Figovsky's patent, it will be appreciated that there still is dependence on a main starting material that is a commercial petrochemical, such as a glycidyl ether of diaminophenol with tetraethyl ammonium chloride (Example 1-1). The methods of Figovsky (and of others) rely on commercial petrochemical starting materials to make nonisocyanate polyurethane networks.

It will be appreciated that polyurethane networks are just one of many kinds of polymers that have been developed over the years.

Speaking with regard to polymers generally, polymers prepared from renewable natural resources have become increasingly important because of their low cost, ready availability, and possible biodegradability. Kaplan, D. L., Biopolymers from renewable resources, Springer-Verlag (New York) 1998.

Vegetable oils are renewable triglyceride oils based on different fatty acids with varying degrees of unsaturation. Their conversion to useful intermediates for polymeric materials is significant scientifically, economically, and environmentally.

Soybean oil (SBO) is the most readily available and one of the lowest cost vegetable oils in the world. Markley, K. S., Soybean and soybean products, vol. 2, Interscience (New York), 1951; Soy-based paint and coating technical fact sheet, United Soybean Board, 1997.

In the past decade, much effort has been dedicated to producing SBO-based polymeric materials. Recently, Wool and coworkers, as well as others, have reported the use of SBO and other triglyceride oils to synthesize several different types of monomers which can promote polymeric networks with a wide range of physical properties. Khot, S. N., Lascala, J. J., Can, E., Morye, S. S., Williams, G. I., Palmese, G. R., Kusefoglu, S. H., Wool, R. P., J Appl Polym Sci, 2001, 82, 703; Wool, R., Kusefoglu, S., Palmese, G., Khot, S., Zhao, S., Zhao, R., U.S. Pat. No. 6,121,398 (2000).

The generation of these monomers was possible by the use of different functionalities present in the triglyceride molecules, i.e., double bond, the allylic carbon, the ester group and the carbon alpha to the ester group, which can be transformed into other reactive polymerizable moieties.

One of the major interests of other researchers has been investigation into the possibility of converting SBO into polyols for use in the polyurethane industry. Petrovic and coworkers have used epoxidized soybean oil (ESBO) to develop a range of polyols which can then be reacted with isocyanates to produce polyurethanes with useful properties. Guo, A., Cho, Y., Petrovic, Z. S., J Polym Sci A (2000), 38, 3900; Petrovic, Z. S., Guo, A., Zhang, W., J Polym Sci A (2000), 38, 4062; Guo, A., Javni, I., Petrovic, Z., J Appl Polym Sci (2000), 77, 467; Javni, I, Petrovic, Z. S., Guo, A., Fuller, R., J Appl Polym Sci (2000), 77, 1723; Javni, I., Zhang, W., Petrovic, Z. S., Polym Mat Sci Eng (2002), 86, 387; Petrovic, Z. S., Zhang, W., Zlatanic, A., Lava, C. C., Polym Mat Sci Eng (2002), 86, 377; Guo, A., Demydov, D., Zhang, W., Petrovic, Z.S., Polym Mat Sci Eng (2002), 96, 385.

ESBO is the result of epoxidation of the double bonds of the SBO triglycerides with hydrogen peroxide, either in acetic acid or in formic acid. Swem, D., Billen, G. N., Findley, T. W., Scanlan, J. T., J Am Chem Soc (1945), 67, 1786; Meffert, A., Kluth, H., U.S. Pat. No. 4,886,893 (1989); Rangarajan, B., Havey, A., Grulken, E. A., Culnan, P.D., J Am Oil Chem Soc (1995), 72, 1161. ESBO is industrially available in large volumes at a reasonable cost.

Much attention has also been paid to carbon dioxide as the most inexpensive and readily available carbon resource. Inoue, S., Organic and bioorganic chemistry of carbon dioxide, in Inoue, S., Yamazaki, N., eds., Kodonsha Ltd.: Tokyo (1982).

Active investigation of the incorporation of carbon dioxide into organic molecules has been carried out from an economical and environmental point of view. Among many studies of chemical carbon-dioxide fixation, the reaction of oxiranes and carbon dioxide to provide the five-membered cyclic carbonate has received much attention because of its simple reaction, high yield, and harmless nature of the reagents. Kihara, N., Hara, N., Endo, T., J Org Chem (1993), 58, 6198; Iwasaki, T., Kihara, N., Endo, T., Bull Chem Soc Jpn (2000), 73, 713.

The reaction can be performed with the help of a catalyst under atmospheric pressure at about 100° C. (Scheme (a), below). Scheme (a) shows the reaction of oxirane with carbon dioxide. A large number of catalyst systems have been reported in the literature for this reaction; among them the alkali metal halides, quaternary ammonium halides, and polystyrene bound quaternary ammonium salts are the most effective. Kihara et al., supra; Iwaski et al., supra; Nishikubo, T., Kameyama, A., Yamashita, J., Tomoi, M., Fukuda, W., J Polym Sci A (1993), 31, 939.

As has been demonstrated, five-membered cyclic carbonates readily react with primary amines at room temperature to yield 2-hydroxyethylurethane quantitatively (Scheme (b), above). Kihara, N., Endo, T., Makromol Chem (1992), 193, 1481.

Furthermore, recently Endo and coworkers, as well as others, have reported the polyaddition reaction of bifunctional cyclic carbonates with aliphatic diamines to give polyhydroxyurethanes, often commonly called "nonisocyanate polyurethanes" (NIPUs). Kihara, N., Endo, T., J Polym Sci A (1993), 31, 2765; Kihara, N., Kushida, Y., Endo, T., J Polym Sci A (1996), 34, 2173; Steblyanko, A., Choi, W., Sanda, F., Endo, T., J Polym Sci A (2000), 38, 2375; Kim, M.-R., Kim, H.-S.; Ha, C.-S.; Park, D.-W.; Lee, J.-K., J Appl Polym Sci (2001), 81, 2735; Tomita, H., Sanda, F., Endo, T., J Polym Sci A (2001), 39, 851 & 860; Figovski, O., L., U.S. Pat. No. 6,120,905 (2000); Gabriel, R., Piotrowska, A., Polymer (2002), 43, 2927.

They showed that one of the advantageous features of this polyaddition was its high chemoselectivity, i.e., it could be prepared in the presence of water, alcohol, and esters.

SUMMARY OF THE INVENTION

Polymers made from renewable natural resources rather than commercial petrochemicals are highly desirable. The present invention provides novel carbonated vegetable oils (of which a preferred example is a carbonated soybean oil) and polymeric networks made from natural resources (such as, preferably, epoxidized vegetable oils, most preferably of which are mentioned epoxidized soybean oils), of which nonisocyanate polyurethane networks are mentioned as a most preferred example. The present invention also provides novel methods of making polymeric networks (such as, e.g., polyurethane networks). Also, the present invention provides novel methods of treating natural resources (such as, e.g., oils, such as, preferably, vegetable oils (e.g., soybean oil, linseed oil, sunflower oil, palm oil, etc.), most preferably, soybean oil.

In a preferred embodiment, the present invention provides novel products that are carbonated natural oils, preferably carbonated vegetable oils, such as carbonated soybean oil, carbonated linseed oil, etc., of which a particularly preferred example is a carbonated soybean oil (CSBO).

The present inventors have recognized the benefits of carbonating a vegetable oil (such as soybean oil, linseed oil, palm oil, sunflower oil, etc.), and have discovered that a carbonated product (such as a carbonated soybean oil) of such a natural starting material may be made into a polymeric network. In a preferred embodiment, the present invention provides a monomeric functionalized CSBO, from which may be subsequently polymerized a nonisocyanate polyurethane network. The present inventors provide novel methods for producing monomeric functionalized CSBO products and polyurethane network products.

DETAILED DESCRIPTION OF A PREFERRED EMBODIMENT

The present invention provides a method of converting an epoxide ring to a five-membered cyclic carbonate ring, comprising a step of: reacting a starting material that contains an epoxide ring with carbon dioxide, wherein the epoxide ring is converted to a five-membered cyclic carbonate ring. Such a starting material containing an epoxide ring(s) is particularly preferred for use when contained in a natural resource, especially a non-hazardous natural resource, of which epoxidized vegetable oils are preferred examples, with epoxidized soybean oil (ESBO) being a particularly preferred example.

Thus, in a preferred embodiment, the present invention provides a method of making a monomeric functionalized oil, comprising the step of: carbonating an epoxidized vegetable oil, wherein a carbonated vegetable oil is produced.

As the vegetable oil, there may be used, e.g., soybean oil (SBO), linseed oil, palm oil, sunflower oil, or other vegetable oils, of which soybean oil is a particularly preferred example. Vegetable oils are commercially available, and may even be purchased at a grocery store. Using such a non-hazardous starting material is beneficial. Epoxidization of a vegetable oil may be accomplished by appropriate chemical derivatization. Alternately, vegetable oils may be purchased in epoxidized form.

Among the carbonated vegetable oils that may be produced according to the present invention are vegetable oils containing cyclic carbonate groups, of which carbonated soybean oil (CSBO) is mentioned as a preferred example of a novel carbonated vegetable oil.

The carbonating according to the present invention may be achieved by reacting the epoxidized vegetable oil (such as ESBO) with carbon dioxide (gaseous form). Carbon dioxide is readily commercially available. Most preferably, a catalyst is present for the carbonation. A particularly preferred example of a catalyst to use during carbonation is tetrabutylammonium bromide (TBAB). Other examples of catalysts tested are mentioned in the Experiment, below. Advantageously, the present invention provides for converting the epoxidized vegetable oil to carbonated oil without any significant side reactions occurring, such as, for example, when ESBO is converted to CSBO.

Such novel methods according to the present invention provide a variety of novel products, including, e.g., a modified vegetable oil comprising a carbonated vegetable oil (such as carbonated soybean oil, etc.); a modified vegetable oil comprising: a vegetable oil containing cyclic carbonate groups (such as a modified soybean oil); etc.

A particularly preferred use of these novel carbonated products is as a reaction product for forming a nonisocyanate polyurethane network, such as by mixing (1) a carbonated vegetable oil (such as CSBO, etc.,) and (2) an amine having functionality of at least two. Most preferably, the carbonated vegetable oil and amine are mixed stoichiometrically at or within nearly balanced stoichiometry, preferably within ±15% of balanced stoichiometry. Preferred examples of amines having functionality of at least two are, e.g., ethylenediamine (ED), hexamethylenediamine (HMD), and tris(2-aminoethyl) amine (TA). Other non-mono-amines may be used. Most preferably, the inventive method includes a viscous solution being produced from the mixing of the carbonated vegetable oil and the amine having functionality of at least two, and the viscous solution is transferred into a mold, followed by curing.

Notably, the present invention provides a nonisocyanate polyurethane network produced from a carbonated vegetable oil.

Nonisocyanate polyurethane networks provided by the present invention may be useful for, e.g., rigid foams; flexible foams; automotive application, such as for bumpers, dashboards, seating, trim components, truck beds and repair putty; construction applications, such as concrete additives, flooring and crack barriers; marine applications, such as decking; consumer products, such as appliances, footwear, furniture, toys; etc., and other applications for nonisocyanate polyurethane networks and elastomeric materials.

Advantageously, the reaction described above for carrying out aspects of the present invention may be conducted at atmospheric pressure.

Reference is now made to a particularly preferred embodiment of the present invention, in which there is synthesized an SBO containing cyclic carbonate moieties, i.e., a carbonated soybean oil (CSBO). For such synthesis, the starting material is an SBO having pendant epoxide groups, i.e., ESBO, a commercially available material of the following basic repeating structure.

ESBO

The invention provides for reaction of ESBO with carbon dioxide (supplied in gaseous form), converting ESBO to CSBO. The repeating unit for the novel CSBO product is shown below:

CSBO

It will be appreciated that CSBO is one example of a novel product according to the invention, and that other novel carbonated vegetable oils include the cyclic carbonate group as seen in the formula for CSBO while having different respective chains.

The novel CSBO product may according to the present invention be reacted with a polyamine (of amine functionality two or higher) to obtain a nonisocyanate polyurethane (NIPU) network, such as where the polyamines may react with the carbonate moiety on two different chains or with two different carbonate moieties on the same chain. An amine of functionality two or higher includes any amine which is not a mono-amine.

Without the invention being limited to the following Example, The following Experimental Example relates to making and CSBO, and to using CSBO to make a nonisocyanate polyurethane product.

EXPERIMENTAL EXAMPLE

Materials

Epoxidized soybean oil (Paraplex G-62) with a molecular weight of ca. 1000 g/mol and an oxygen content of 6.8% (~4.2 epoxy groups per triglyceride molecule) was provided by C. P. Hall Co. Carbon dioxide was purchased from Air Products and was used after passage through a Drierite column. Tetrabutylammonium bromide (TBAB), sodium iodide, lithium bromide, benzyltrimethylammonium bromide, Amberlit IR 400(Cl), ethylenediamine (ED), hexamethylenediamine (HMD), and tris(2-aminoethyl)amine (TA) were purchased from Aldrich. Amines were used as received or distilled over KOH prior to use, FTIR spectra were recorded on a Nicolet 510 FT-IR spectrometer. $^1$H and $^{13}$C-NMR spectra were recorded on a Varian Inova 400 (400 MHz) spectrophotometer using tetramethylsilane as an internal standard. GPC profiles were obtained with a Waters SEC equipped with an autosampler 410 RI detector eluted with THF at 40° C. calibrated by polystyrene standards. Viscosity measurements were made at ambient temperature using cone and plate geometry over a shear rate range of 0 to 75 s$^{-1}$ using an AR-1000 Rheometer from TA Instruments. Thermal stabilities of ESBO and CSBO were characterized using TGA (Model SSC 5200, Seiko) while air purging using a heating rate of 3° C./min over the temperature range of ca. ambient to 500° C.

Synthesis

Reaction of Epoxidized soybean Oil (ESBO) with Carbon Dioxide

ESBO (200 g) and dried tetrabutylammonium bromide (13.52 g; 5 mol % with respect to epoxy groups) was placed in a 500-mL flask equipped with a gas dispersion inlet tube and an outlet. The reaction mixture, while stirred magnetically, was heated to ~110° C., at which point almost all of the catalyst dissolved. A medium flow of $CO_2$ was then introduced. While the temperature and $CO_2$ flow were maintained, the level of reaction was monitored by IR spectroscopy of small aliquots taken at 5-h intervals. As the absorbance band due to formation of the cyclic carbonate moiety appeared and increased in intensity at 1805 cm$^{-1}$, the oxirane C-O twin bands at 823 and 845 cm$^{-1}$ decreased and disappeared. The reaction was complete in about 70 h. The catalyst was completely removed by dissolving the reaction mixture in ethyl acetate and extracting twice with water. The organic layer was then dried over molecular sieves and the solvent was evaporated to give 221 g (94% yield) of the clear light-brown carbonated soybean oil with a viscosity of 13,200 cps at 25° C.

Reaction of Carbonated Soybean Oil with n-butylamine (Model Reaction)

n-Butylamine (5.85 g) was added to CSBO (11.76 g) dissolved in THF (8 mL). The solution was stirred at room temperature and the extent of reaction was followed by IR spectroscopy. While the absorbance band due to cyclic carbonate moiety at 1805 cm$^{-1}$ diminished and finally disappeared, new bands due to the urethane C═O, —NH, and —OH groups appeared at 1704, 1545, and 3332 cm$^{-1}$, respectively. The reaction was complete after 12 h. The mixture was then dissolved in chloroform and extracted twice with slightly acidic aqueous solution. The organic layer was separated and dried, and the solvent was evaporated to give 13.5 g (92% yield) of an olive-oil-colored product.

Preparation of NIPUs

To lower the viscosity, CSBO (11.76 g) was placed in a small beaker and was heated to 60° C. in a constant-temperature oven. ED (1.20 g) was then added and mixed thoroughly. The viscous solution was poured into a small mold, covered, and heated at 70° C. for 10 h and then at 100° C. for 3 h to give a light-brown, transparent, and flexible polymeric material of 4 mm thickness. The same procedure was followed for experiments utilizing different ratios of CSBO/ED and also when HMD or TA was used as a di- or trifunctional amine, respectively.

Characterization of NIPUs

Solvent Extraction

Thin sliced samples were extracted using toluene as a solvent at room temperature for 24 h. Equilibrium swelling was achieved under these conditions. Drying of the extracted sample was performed under vacuum (30 mmHg) at 100° C. for 12 h. The sol fraction, the mass difference before and after solvent extraction, was expressed in weight percentage normalized to the original dry sample mass. Three samples were used for each test and the results were averaged.

Dynamical Mechanical Analysis

Dynamical mechanical analysis (DMA) operated in the tensile mode was carried out using a Seiko DMA 210 model over the temperature range of −10 to ca. 200° C. Data were obtained at a heating rate of 3° C./min at 1 Hz. In all cases, the cross-sectional areas of samples were maintained as 3.0±0.5 mm$^2$. The grip-to-grip distance was 10 mm.

Tensile Tests

For mechanical property testing, the samples were cut with a die into 2.54-mm-wide dog-bone-shape-strips. The grip-to-grip distance was 10 mm, and the thickness of samples was maintained at ca. 4.0 mm. Tests were made at ambient temperature using a constant crosshead speed (5.0 mm/min) on an Instron (Model 4400R) device with a load capacity of 100 N. Thte samples were gripped with pneumatically operated clamps.

Experimental Results and Discussion

Reaction of ESBO with Carbon Dioxide

Figure 7A:
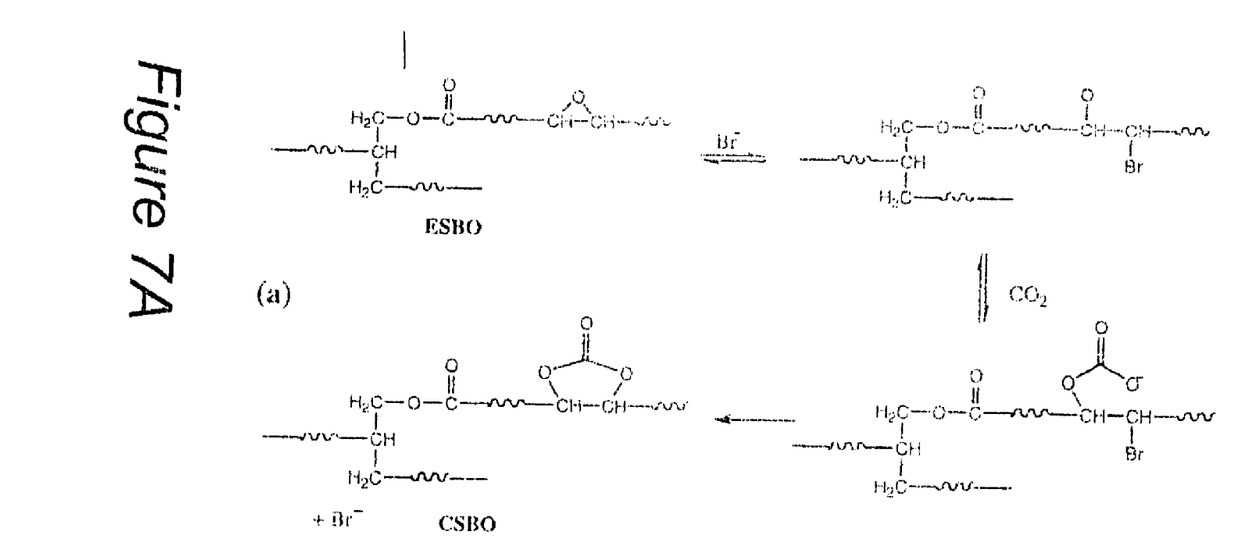
FIGS. 7a–b are reactions according to the present invention, with a schematic (a) of the reaction, according to an embodiment of the invention, of epoxidized soybean oil (ESBO) with carbon dioxide to form carbonated soybean oil (CSBO), and a schematic (b) of the model reaction, according to an embodiment of the invention, of CSBO with n-butylamine.

Epoxidized soybean oil (ESBO) (Paraplex G-62) with an average epoxy content of 4.2 per triglyceride molecule was used for the reaction with carbon dioxide. The reaction according to FIG. 7(a) was performed at ~110° C. with different types of catalysts such as NaI, LiBr, benzyltrimethylammonium bromide, Amberlit IR 400(Cl), and TBAB. Of the catalysts employed, very high conversion of ESBO to carbonated soybean oil (CSBO) was particularly facilitated when a 5% molar concentration of TBAB with respect to epoxy content was used. The other catalysts, being insoluble or only partially soluble, resulted in very low to medium conversions.

Figure 1A:
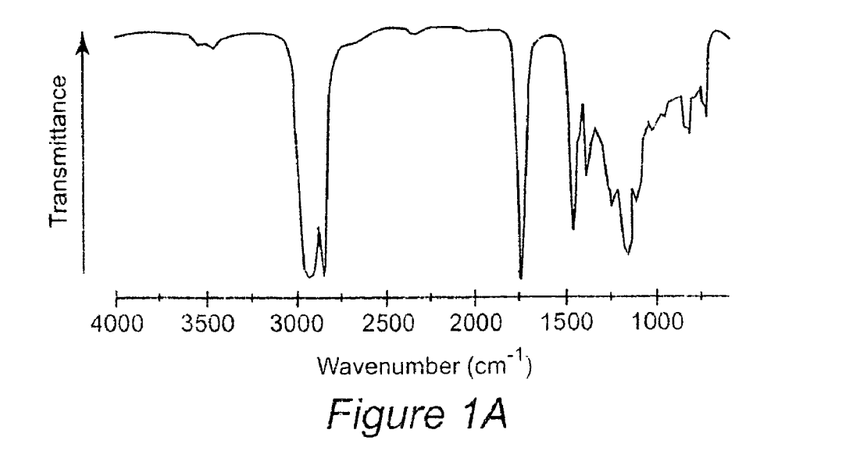
FIGS. 1a–c show FT-IR spectra, of, respectively: epoxidized soy bean oil (ESBO) (FIG. 1a), carbonated soybean oil (CSBO) (FIG. 1b) and a reaction product of CSBO and n-butylamine (FIG. 1c).
Figure 1B:
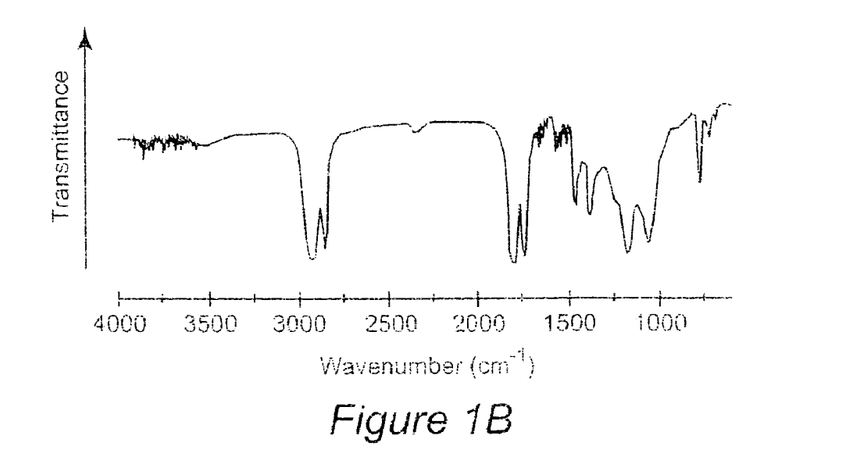
Figure 7B:
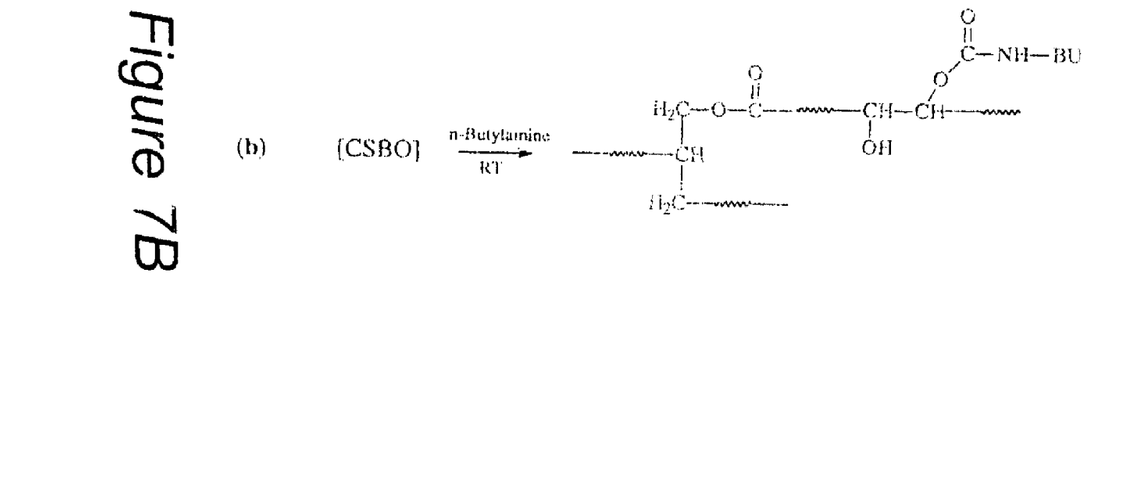

The extent of the reaction was followed using IR spectroscopy by focusing on the appearance of a new peak at 1805 cm$^{-1}$ due to the carbonyl of the cyclic carbonate moieties and the disappearance of the twin epoxy bands at 845 and 823 cm$^{-1}$ (FIG. 1a and FIG. 1b). FIG. 7(b) provides the proposed mechanism for this reaction. It resembles that given for the reaction of oxiranes with carbon dioxide. Kihara et al., J Organic Chem (1993), supra; Kihara et al., Bull Chem Soc Jpn (2000), supra.

Figure 2A:
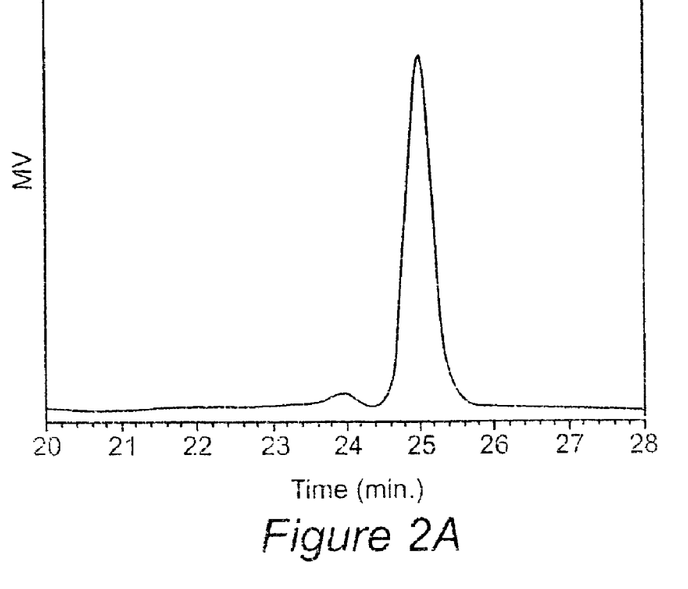
FIGS. 2a–b show GPC profiles, of, respectively: ESBO (FIG. 2a), and CSBO (FIG. 2b).
Figure 2B:
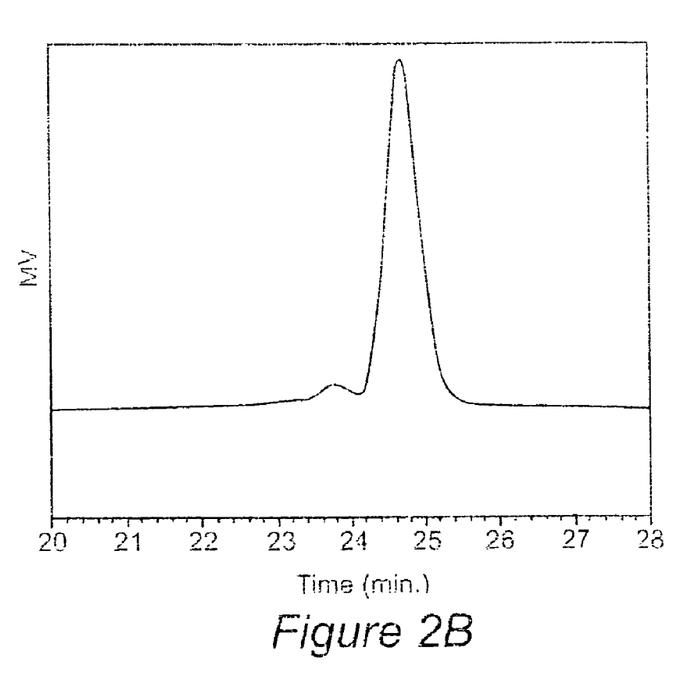

In addition, the appearance of a new peak at 153.8 ppm in the $^{13}$C-NMR of the product due to the C═O of the cyclic carbonate confirmed the conversion of epoxy groups. The conversion was almost quantitative (94%) after about 70 h. The percentage conversion could be evaluated by $^1$H-NMR considering the signals at about 2.70–3.00 ppm arising from the —CH groups of the epoxy rings in ESBO and CSBO. The viscosity of the product at 25° C. was 13200 cP compared to the much lower value of 450 cP for ESBO. The high value of viscosity is believed to be due to the presence of the polar cyclic carbonate groups causing enhanced intermolecular interactions. However, to check that no significant amount of intermolecular reactions occurred resulting in oligomerization or polymerization, during conversion GPC was performed on both ESBO and CSBO. FIGS. 2a–b show the GPC profiles and, as seen, no significant change in polydispersity of the product was observed; however, its molecular weight ($M_n$1755 g/mol) was slightly higher than that of ESBO ($M_n$1414 g/mol) as estimated by using polystyrene standards.

Figure 3:
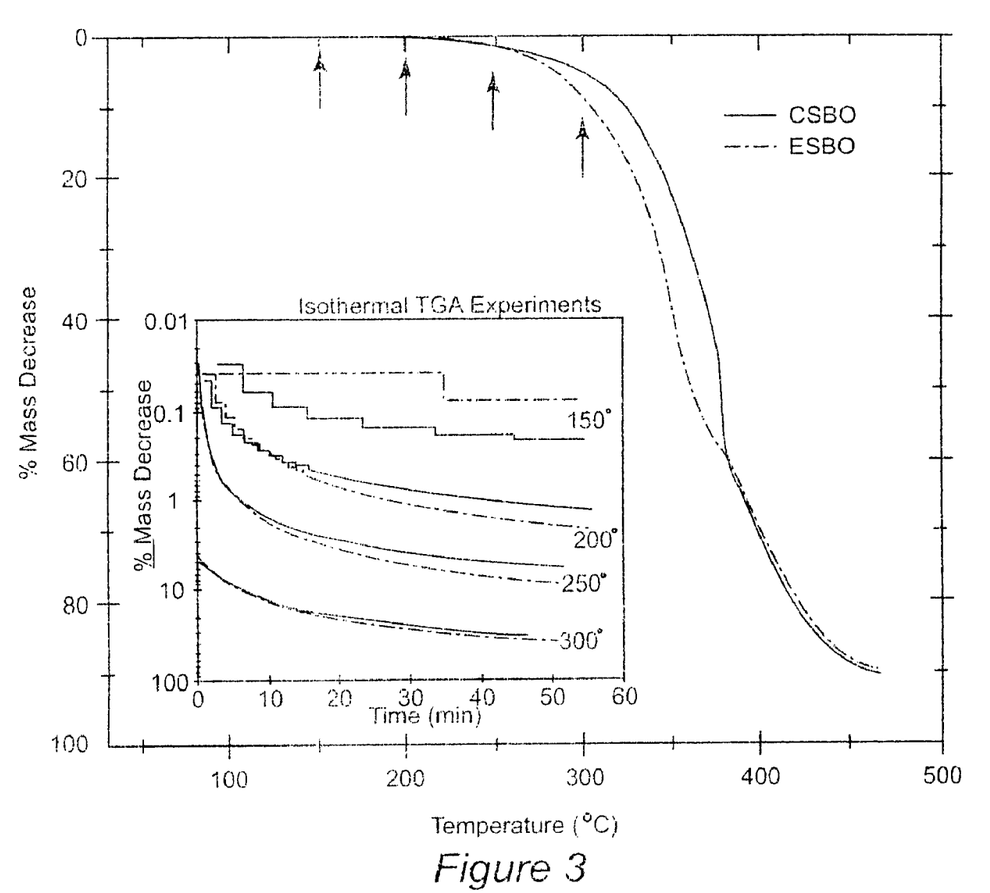
FIG. 3 shows TGA profiles of mass loss with temperature for ESBO and CSBO.

FIG. 3, in which the percentage mass decrease with temperature is provided, contrasts the thermal behavior of the two modified soy oils (ESBO and CSBO) as obtained by TGA. While there is a slight increase in mass when converting the ESBO to that of the CSBO, which could influence their respective vapor pressures, the TGA profiles of these two materials suggest that CSBO is more thermally stable than ESBO—particularly in the range of approximately 250–375° C. In addition, the FIG. 3 (inset) also shows some isothermal TGA experiments carried out at four different temperatures between 150 and 300° C. at 50° C. intervals (note that the Y-scale of the inset is in logarithmic scale.) It is noted that at 150° C., the temporal mass decrease is quite insignificant for both modified soy oils, being on the order of 0.1% for the time interval studied. However, for the high temperature range, there is a more significant mass decrease in the time interval with ESBO than for CSBO.

Reaction of CSBO with Carbon n-butylamine (Model Reaction)

Figure 1C:
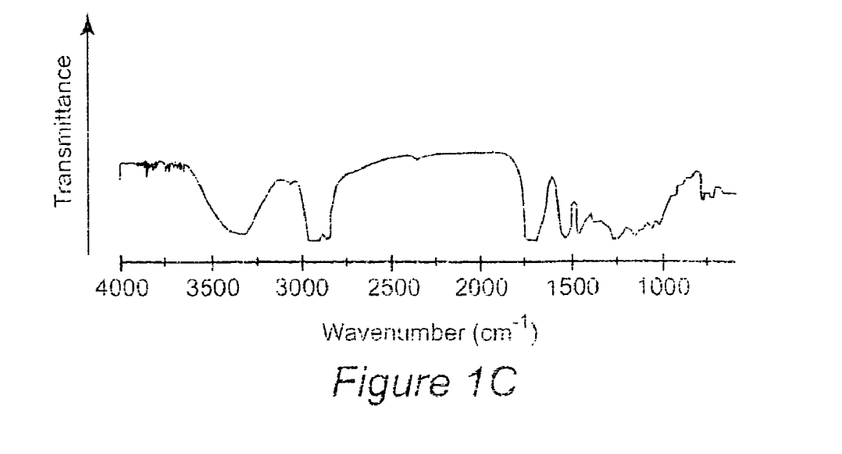

As a model, the reaction of CSBO with n-butylamine was performed to show the ring opening of cylcic carbonate moieties and, the formation of β-hydroxyurethane systems on the triglyceride molecule (see FIG. 7(b)). The extent of reaction was monitored by IR spectroscopy (FIG. 1c). The formation of new bands at 1704 and 1545 $cm^{-1}$ due to urethane linkages as well as a band at 3332 $cm^{-1}$ due to hydroxyl groups and disappearance of the peak at 1805 $cm^{-1}$ of cyclic carbonate moieties confirmed the conversion of cyclic carbonate into the β-hydroxyurethane systems in the triglyceride molecule. The absorbance bands due to the ester and urethane groups overlap to some extent. No amide I band was observed in the IR spectrum of the product, which showed that no transamidation reaction occurred. This was in accordance with what Endo and coworkers reported for the formation of polyhydroxyurethanes. Kihara et al., J Polym Sci A (1993), supra; Steblyanko, supra.

In addition, the disappearance of the peak at 153.8 ppm in the $^{13}$C-NMR spectrum of the product due to the C=O of the cyclic carbonate and the appearance of a new peak at 157 ppm of C=O of the urethane groups also confirmed the formation of the urethane moieties.

Preparation of Nonisocyanate Polyurethane Networks

Preparation of nonisocyanate polyurethane network materials was easily performed by thoroughly mixing the equivalent weights of CSBO and ED, HMD, or TA at 60° C., pouring the viscous solution into a small mold, and subsequently curing. CSBO was heated up to about 60° C. to reduce the viscosity to an extent that mixing became possible.

Characterization of Nonisocyanate Polyurethane Networks

Solvent Extraction Experiments

Figure 4:
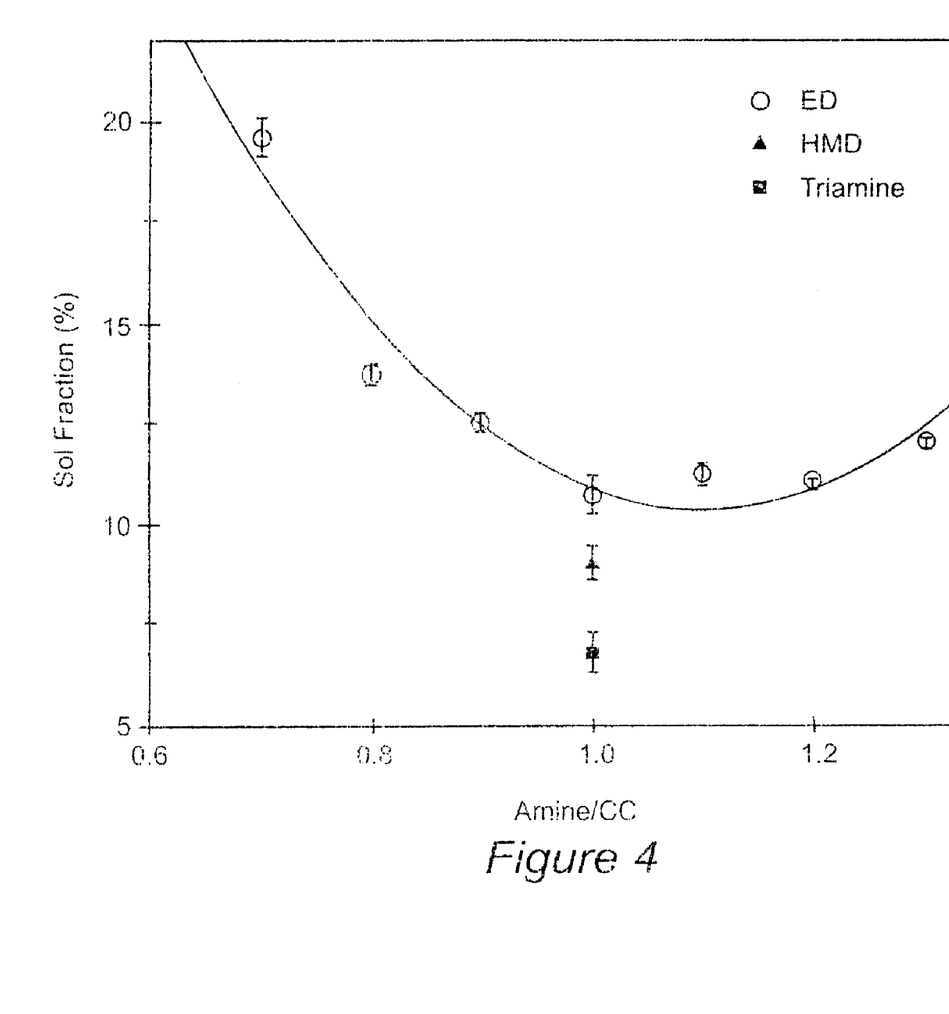
FIG. 4 is a graph of variation of sol fraction as a function of the mass ratio of amine functionality to cyclic carbonate.

Sol fraction, as a function of the molar ratio of the amine functionality of ED to cyclic carbonate, is shown in FIG. 4. Also included are two other data points which arise from the networks made from an equal molar ratio of the amine functionality to cyclic carbonate for either HMD or TA. Throughout the swelling tests, all samples maintained their shape integrity, indicating that the network reaction had distinctly achieved the gel point. It is clear that the sol fraction decreases at first, with the addition of ED and reaches a minimum at the stoichiometric balance. With further increases in ED content, the sol fraction again increases since there is a further offset again in stoichiometry. From this, it can be inferred that at the stoichiometric balance, the corresponding nonisocyanate polyurethane network provides the "best" network structure possessing the least amount of solubles and dangling chain ends.

The higher functionality amine, TA, shows an even lower amount of sol fraction at the stoichiometric balance point, which is readily understood from the fact that TA will contribute to promote a tighter network structure than the equivalent diamine moieties. The longer chain and more flexible diamine, HMD, exhibited a slightly lower sol fraction compared with ED.

DMA Results

Figure 5A:
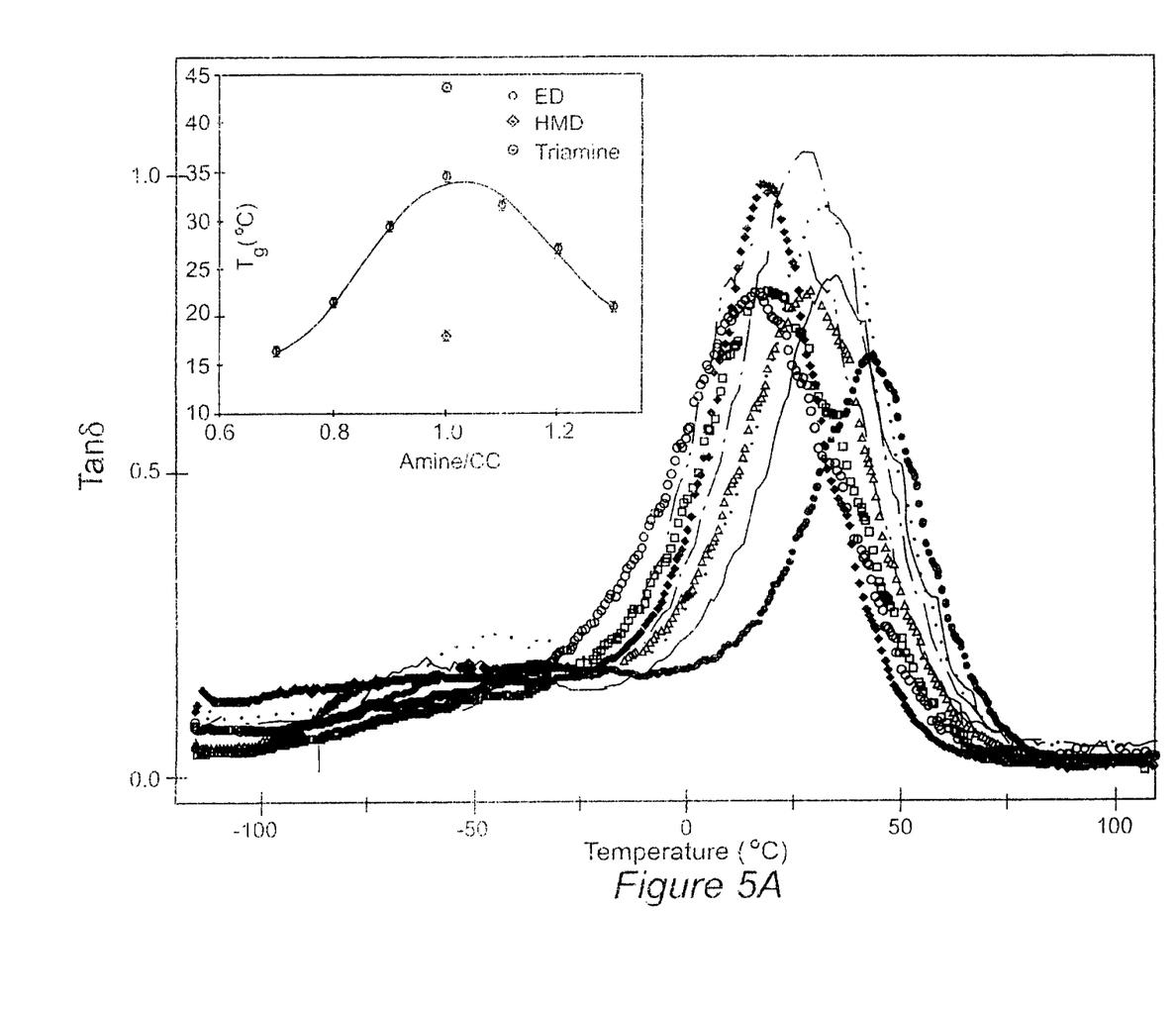
FIGS. 5A–5B are graphs of dynamic mechanical analysis for various nonisocyanate polyurethane (NIPU) samples, plotting temperature versus tan δ in FIG. 5A, and temperature versus storage modulus (E') in FIG. 5B.
Figure 5B:
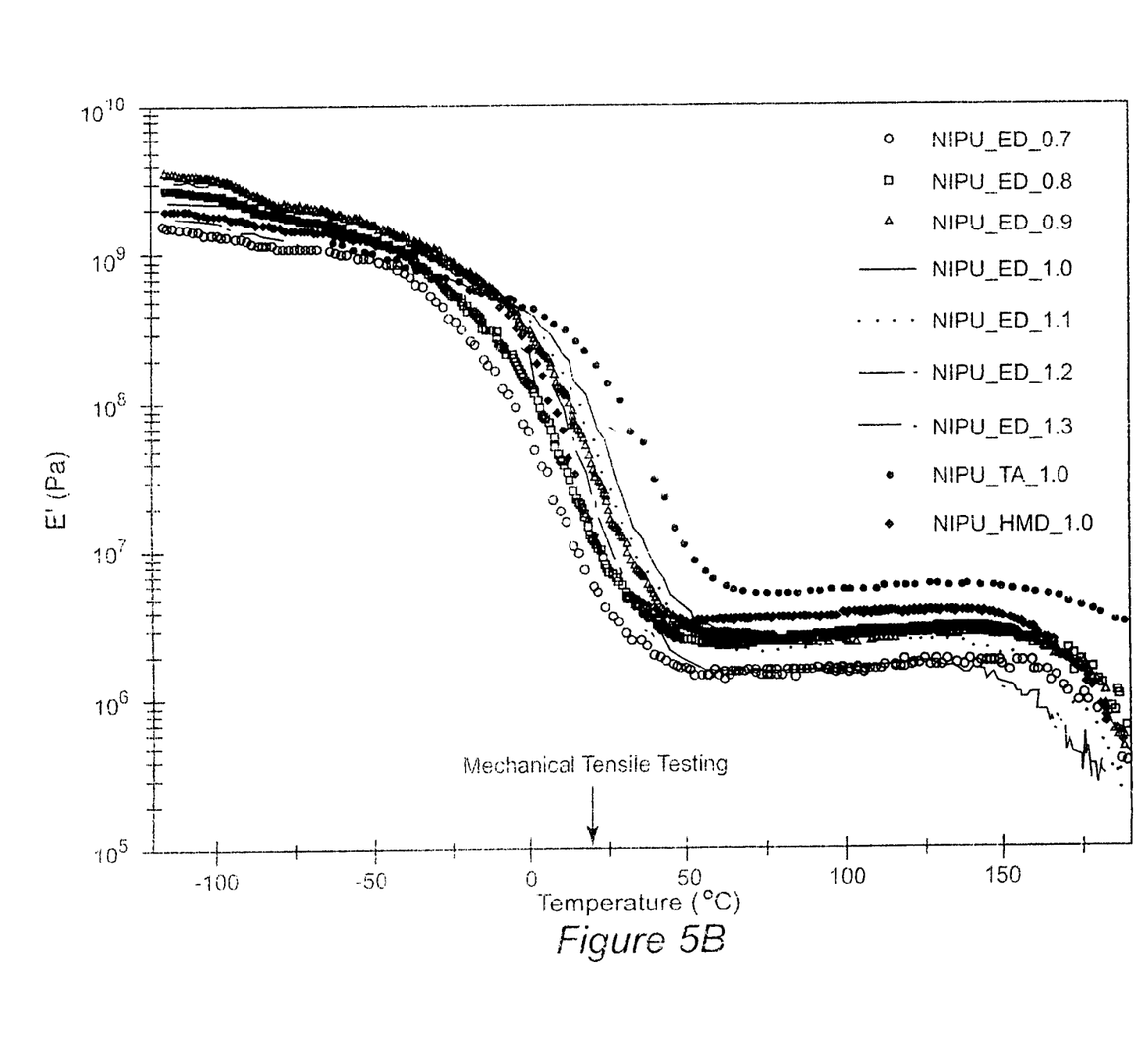

In FIGS. 5A and 5B, the DMA parameters of tan δ and E' are shown as a function of temperature, respectively. The principal peak temperature, which is apparent in the tan δ results, is distinctly assigned to the glass transition of the corresponding network. For the series with varying ED content, it is noted that the Tg systematically increases with ED addition, up to the stoichiometric balance, but then again decreases with further ED concentration. The overall thermal window of Tg variation with ED content is also noted to be about 20° C.

In addressing the two remaining data points associated with the triamine, TA, as well as the second diamine HMD, it is noted that the TA-based network provided the highest Tg value of approximately 43° C., whereas the HMD network exhibited the lowest Tg at stoichiometric balance at approximately 18° C. For clarity, the variation of the Tg's, as determined by tan δ, are presented in the FIG. 5A inset for all samples. These results regarding Tg are clearly consistent with respect to the earlier sol fraction behavior in that, the nearer the stoichiometric balance, the higher the Tg will be for those systems with varying ED, and in addition, the triamine, TA, again provides the highest glass transition temperature, indicative of the fact that it has a tighter network than that of either the ethylene or the hexamethylene diamine-based networks. Of note is also the fact that the HMD-based network gives a somewhat lower Tg than the corresponding ED containing sample, which may be considered in view of the higher level of flexibility of othe HMD moiety. Finally, another interesting observation relating to the Tg behavior is that the intensity of the glass transition, as denoted by the tan δ value at its peak, decreases in the order of HMD>ED>TA. This ordering is the reverse of the ordering of the Tg's of these same respective three stoichiometrically balanced samples.

It is also noted that, in FIG. 5B, there is a relatively broad and weak secondary loss peak that occurs at about −50° C. for some of the samples. This small relaxation peak may not be real but rather may be associated with instrumental artifacts.

In addressing the storage modulus data given in FIG. 5B, it is noted that its behavior above the respective Tg of a given sample shows that the TA-based urethane network displays the highest rubbery plateau modulus, consistent with its higher level of cross-link density (lowest solubles) as well as its higher Tg. The samples showing the variation in ED content illustrate that the highest rubbery modulus occurs at stoichiometric balance and is lower for any other composition irrelevant of whether it is the diamine or the cyclic carbonate moiety that is in excess. The HMD-based network exhibited the second highest rubbery plateau modulus relative to all other networks studied. Specifically, it was below the network made from TA but above all of those based on ED. While it was noted above that the more flexible HMD gave rise to a lower Tg than the stoichiometrically balanced networks based on TA and ED, its rubbery plateau modulus need not necessarily be the lowest of the three. In fact, it is noted that the ordering of the rubbery plateau moduli for the three stoichiometrically balanced networks is inversely related to the sol fraction.

Tensile Testing Results

Figure 6:
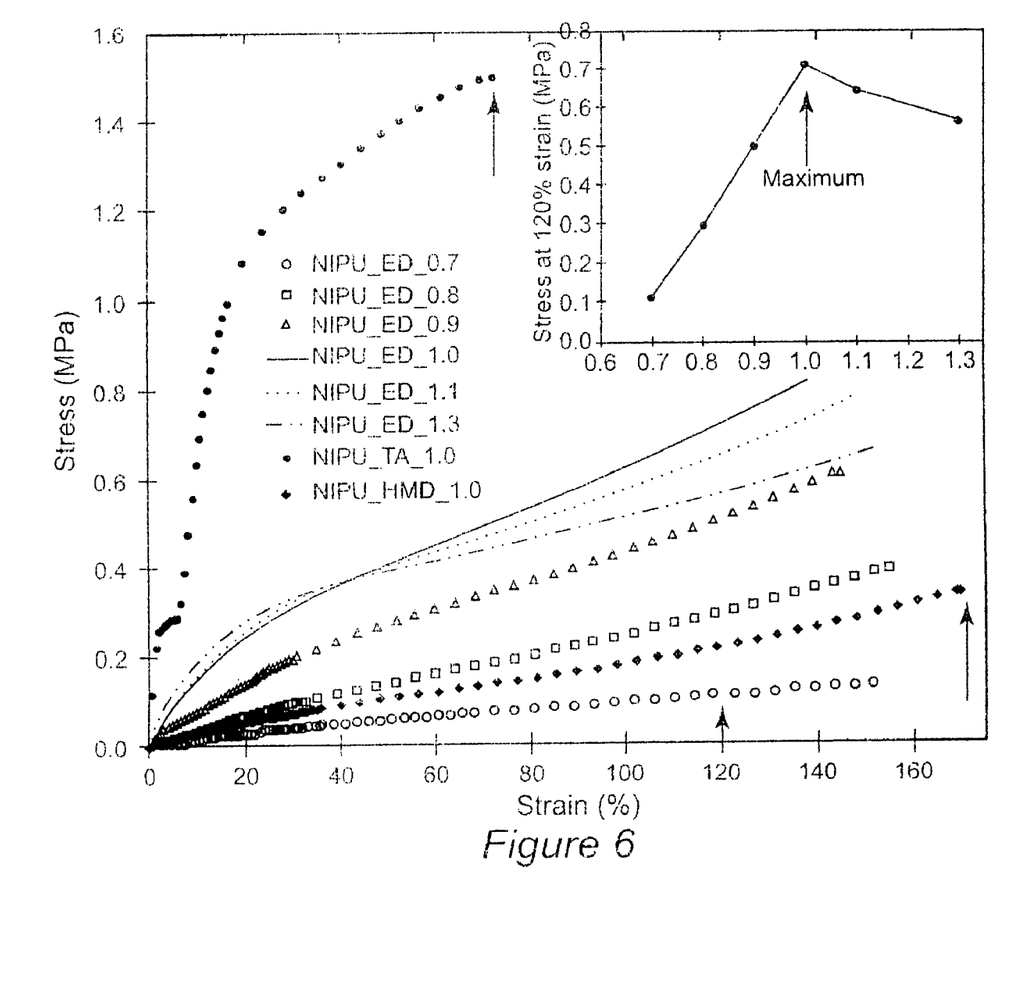
FIG. 6 is a graph of tensile stress experiments performed on NIPU samples at ambient.

The results of the tensile experiments performed under room conditions are noted in FIG. 6. The results confirm that the TA-based network displays the highest level of stress for a given strain when compared against the other two stoichiometric balanced materials formulated with either ED or HMD. In addition, the HMD-based network displays the lower modulus of the same three systems even though the rubbery plateau modulus of the HMD network is intermediate to that of the TA and ED networks. This result is simply due to the fact that the HMD material possesses the lower $T_g$, which promotes a lower modulus at ambient temperature where the tensile tests were conducted (see FIG. 5B). Finally, it is particularly noted that, for the stoichiometric balance of ED with the CSBO moiety, the stress-strain behavior is higher than for all other compositions of ED with the results being consistent with the solubles data obtained by extraction and the DMA glass transition results. See also the FIG. 6 (inset), which shows the levels of stress at 120% strain for the samples containing ED. The strain at break for all of the ED-based networks is nearly constant at approximately 150%, thereby showing no systematic dependence on the ratio of ED to that of CSBO. In contrast, the strain at break for the tighter network TA-based material is distinctly lower (approximately 70%) and therefore well below that of any of the ED- or HMD-(170%) based urethanes.

Conclusions from Experiment

Reaction of epoxidized soybean oil with carbon dioxide under atmospheric pressure using tetrabutylammonium bromide as a catalyst to prepare carbonated soybean oil was confirmed. Further, CSBO easily reacts with di- or triamines to produce nonisocyanate polyurethane networks.

Extractables characterization from the various NIPUs made from the three different amines confirmed that all network reactions had easily reached the gel point, since sample integrity was maintained for all materials of equilibrium swelling in toluene. DMA and tensile tests were in harmony with the extractable results in that, as extractable level increased for a given type of amine reactant, $T_g$ and stress at a given strain increased. By varying the stoichiometric balance of the reactant ED with that of the cyclic carbonate moiety, it was confirmed that, as the stoichiometric balance was approached, the level of extractables decreased, while the stress at a given strain and the corresponding network $T_g$ increased. Very consistently, and regardless of the type of the tests employed, the samples made from tri amine showed the lowest soluble fraction (6.8%), the smallest strain at break, $E_b$ (170%). When the amount of ED was varied among samples, the equivalent weight sample carried the lowest soluble fraction (10.7%), the highest $T_g$ (ca. 34° C.), and the highest level of stress among themselves. Strain at break for the samples made from ED were approximately constant regardless of the amount of ED (ca. 150%).

The Experiment described above is exemplary, and the invention is not limited thereto. It will be appreciated that the epoxide ring to be reacted with carbon dioxide may be an epoxide ring included, by way of one example, in an ESBO as discussed above in the Experiment, or included in another derivatized natural resource, such as another vegetable oil; an animal oil; etc. The present invention advantageously provides for making a nonisocyanate polyurethane (NIPU) from a vegetable oil or another renewable natural resource.

While the invention has been described in terms of its preferred embodiments, those skilled in the art will recognize that the invention can be practiced with modification within the spirit and scope of the appended claims.

We claim:

1. A method of producing a nonisocyanate polyurethane network comprising:
   (a) reacting an epoxidized soybean oil (ESBO) with carbon dioxide to obtain a carbonated soybean oil; and
   (b) reacting the carbonated soybean oil with a polyamine having an amine functionality of two or higher to obtain a nonisocyanate polyurethane network.

2. The method of claim 1, wherein a catalyst is present for the reaction step (a).

3. The method of claim 2, wherein the catalyst is tetrabutylammonium bromide (TBAB).

4. The method of claim 1, wherein the epoxidized soybean oil is converted to carbonated soybean oil without any significant side reactions occurring.

5. A method of making a nonisocyanate polyurethane network, comprising mixing and reacting:
   (1) a carbonated vegetable oil; and
   (2) a polyamine having an amine functionality of at least two;
   wherein a nonisocyanate polyurethane network is formed.

6. The method of claim 5, wherein the carbonated vegetable oil and polyamine are mixed stoichiometrically at or within nearly balanced stoichiometry.

7. The method of claim 5, wherein the carbonated vegetable oil is carbonated soybean oil.

8. The method of claim 5, wherein the polyamine is selected from the group consisting of ethylenediamine (ED), hexamethylenediamine (HMD), and tris(2-aminoethyl) amine (TA).

9. The method of claim 5, wherein a viscous solution is produced from the mixing, and the viscous solution is transferred into a mold, followed by curing.

10. The method of claim 5, wherein the epoxidized vegetable oil is carbonated at atmospheric pressure.

11. A polyurethane network comprising: a nonisocyanate polyurethane network produced from a carbonated vegetable oil and a polyamine having an amine functionality of two or higher.

12. A method of producing a foam of a non-isocyanate polyurethane network, comprising:
   (a) reacting an epoxidized vegetable oil with carbon dioxide to form a carbonated vegetable oil;
   (b) reacting the carbonated vegetable oil with a polyamine having an amine functionality of two or higher to obtain a non-isocyanate polyurethane network; and
   (c) processing the non-isocyanate polyurethane network into at foam.

13. The method of claim 12, wherein the foam is a rigid foam.

14. The method of claim 12, wherein the foam is a flexible foam.

15. The method of claim 12, wherein the carbonated product is processed into a non-isocyanate polyurethane network.

* * * * *